United States Patent [19]

Salazar

[11] Patent Number: 5,029,364
[45] Date of Patent: Jul. 9, 1991

[54] VEHICLE DOOR MOUNTING ARRANGEMENT

[75] Inventor: Sumorfin Salazar, Toledo, Ohio

[73] Assignee: Ford Motor Company, Dearborn, Mich.

[21] Appl. No.: 456,883

[22] Filed: Dec. 26, 1989

[51] Int. Cl.⁵ ............................................. E05D 5/00
[52] U.S. Cl. ................................. 16/382; 16/DIG. 43
[58] Field of Search ................. 16/382, 383, 384, 270, 16/DIG. 43

[56] References Cited

U.S. PATENT DOCUMENTS

| | | |
|---|---|---|
| 414,107 | 10/1889 | Cowley . |
| 2,609,069 | 9/1952 | McLaughlin ........................ 16/381 |
| 2,691,538 | 10/1954 | Clausen . |
| 2,700,791 | 2/1955 | Vogel . |
| 3,488,792 | 1/1970 | Ashworth et al. . |
| 4,141,107 | 2/1979 | Sheiman et al. . |
| 4,532,675 | 8/1985 | Salazar . |
| 4,720,895 | 1/1988 | Peebles . |
| 4,748,718 | 6/1988 | Harrison . |
| 4,761,852 | 8/1988 | Sauber .................................. 16/382 |
| 4,765,025 | 8/1988 | Salazar . |
| 4,864,687 | 9/1989 | Calcaterra et al. ................... 16/332 |
| 4,908,908 | 3/1990 | Mitsuoka et al. ..................... 16/251 |

*Primary Examiner*—Robert L. Spruill
*Assistant Examiner*—Carmine Cuda
*Attorney, Agent, or Firm*—Daniel M. Stock; Roger L. May

[57] ABSTRACT

A mounting arrangement is provided in which a vehicle door is attached to a vehicle body via hinge assemblies which are releasably secured to the vehicle body whereby the release may be effected from either the vehicle's interior or exterior surface.

3 Claims, 3 Drawing Sheets

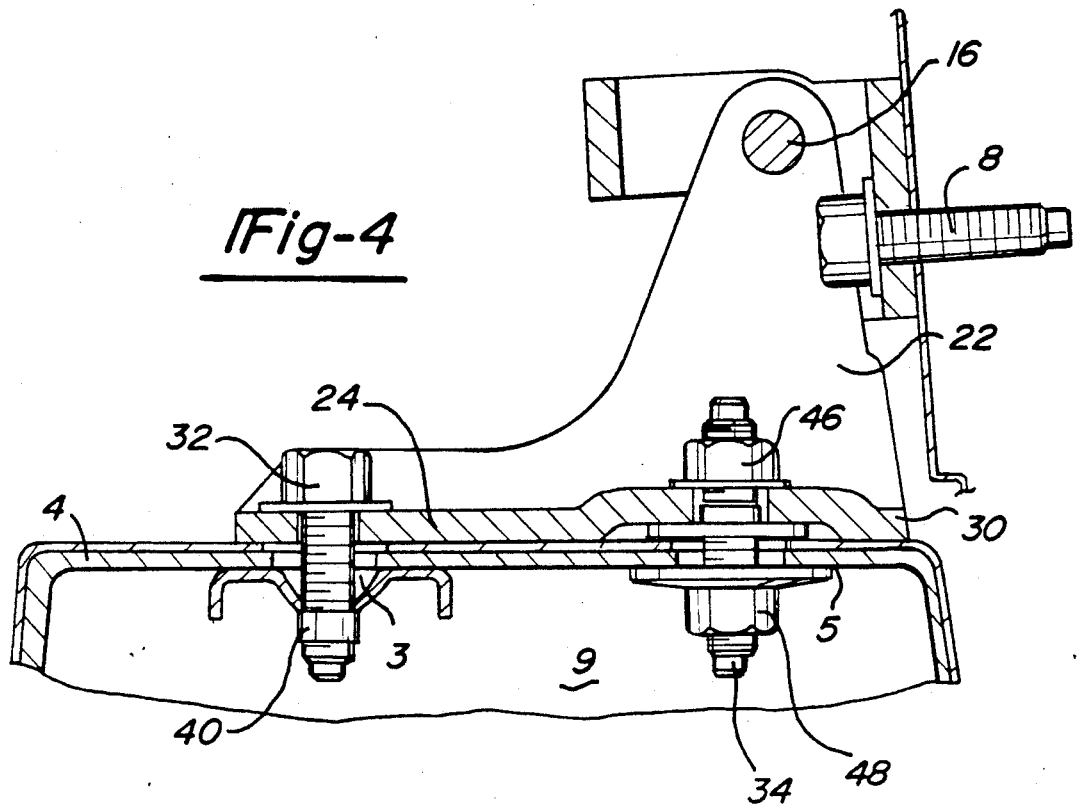
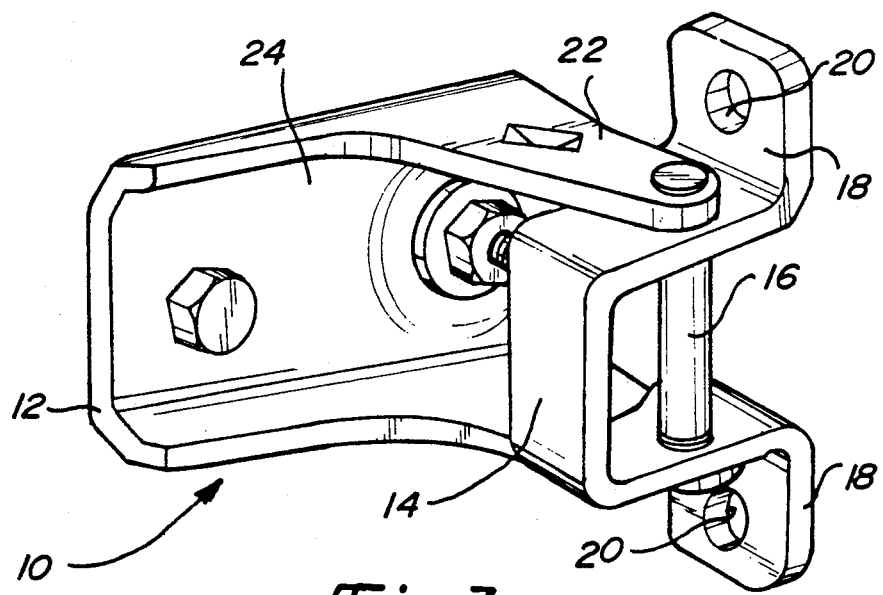

VEHICLE DOOR MOUNTING ARRANGEMENT

BACKGROUND OF THE INVENTION

The present invention relates generally to apparatus for mounting automotive vehicle doors and more specifically to arrangements for effecting this mounting through the use of special fasteners to attach the door and hinge assemblies to the vehicle wherein the fasteners may be released from either interior or exterior surfaces of the vehicle.

DESCRIPTION OF THE PRIOR ART

It is common practice in automotive assembly line operation to assemble the door and hinge assembly to the vehicle body prior to installation of other component parts inside the vehicle's passenger compartment. Paint and other coatings may then be applied to the, doored vehicle without adversely affecting these components. Subsequently, it is sometimes desirable to remove the doors prior to further assembly and trimming operations. It is much easier to trim the doors on separate fixtures removed from the main vehicle assembly line. Also, in order to provide access to the interior of the vehicle and minimize the width of the vehicle assembly line, the doors may be removed rather than left open. After the vehicle's doors and interior are trimmed, the doors are reattached.

Another situation requiring door removal and replacement is encountered when damage occurs. The present invention facilitates the replacement of a vehicle door or a hinge assembly without removing any trim components from the vehicle's interior.

A vehicle door hinge assembly generally consists of a door mounting plate, a body mounting plate, and a pivotal connection between the two plates. The body mounting plate is typically joined to the vehicle body by means of one or more studs or bolts. Generally, hinge attachment apparatus is either releasable from only one side of the vehicle or else access to both sides of the joint is required, as exemplified by Harrison and Peebles U.S. Pat. Nos. 4,748,718 and 4,720,895, respectively. Since access from both sides is often not readily achievable where fasteners on one side are covered by other components during vehicle assembly, disassembly and reassembly can be difficult and time consuming.

SUMMARY OF THE INVENTION

Responsive to the deficiencies in the prior art, it is an object of the present invention to provide means for releasably securing a vehicle door and hinge assembly to a vehicle body wherein the release may be effected from either interior or exterior surfaces of the vehicle. The present invention advantageously uses the accessibility to fastening apparatus connecting the door and hinge assembly to the vehicle body from the vehicle's interior surface when the vehicle interior is not trimmed, and subsequently, from the vehicle's exterior when access to the fastening apparatus is hindered by the vehicle's trimmed interior. Automated means can be used to quickly turn nuts on threaded fasteners along an assembly line. If the door and hinge assembly prevent axial access to fasteners from the exterior of the vehicle surface, it is advantageous to access the fasteners from the interior of the vehicle if axial access for use of automated means is available. Thereafter, when the vehicle interior is trimmed and access to fastening apparatus is prohibited or made very difficult from the vehicle's interior surface, use of tools not requiring axial access, such as wrenches, may be used to tighten and loosen fasteners from the vehicle's exterior surface.

The present invention provides a mounting arrangement for assembling a vehicle door to a vehicle body in which a door mounting plate and a body mounting plate are secured to the vehicle door and body, respectively, with the plates being pivotally connected. The body mounting plate is releasably secured to the vehicle body in a fashion releasable from either interior or exterior surfaces of the vehicle.

According to one feature of the present invention, the body mounting plate contains an aperture through which a stud having two threaded ends passes, securing the plate to the vehicle body and an anti-rotation means is provided between the body plate and the stud.

According to another feature of the present invention, the stud contains an integral washer and the body mounting plate contains a recess such that the washer rests between the plate and vehicle body thus allowing abutment of the plate to the body and locating the stud within the corresponding aperture of the body mounting plate.

BRIEF DESCRIPTION OF THE DRAWINGS

The listed advantages, objects, features and others that the vehicle door mounting arrangement of the present invention and its hinge elements offer over the prior art will be readily appreciated by those skilled in the arts of automotive door and hinge design by reading the following description with reference to the accompanying drawing in which:

FIG. 3 is a perspective view of a complete hinge assembly;

FIG. 4 is sectional view through a hinge assembly along the centerline of the bolt and stud.

DESCRIPTION OF THE PREFERRED EMBODIMENT

Figure 1:
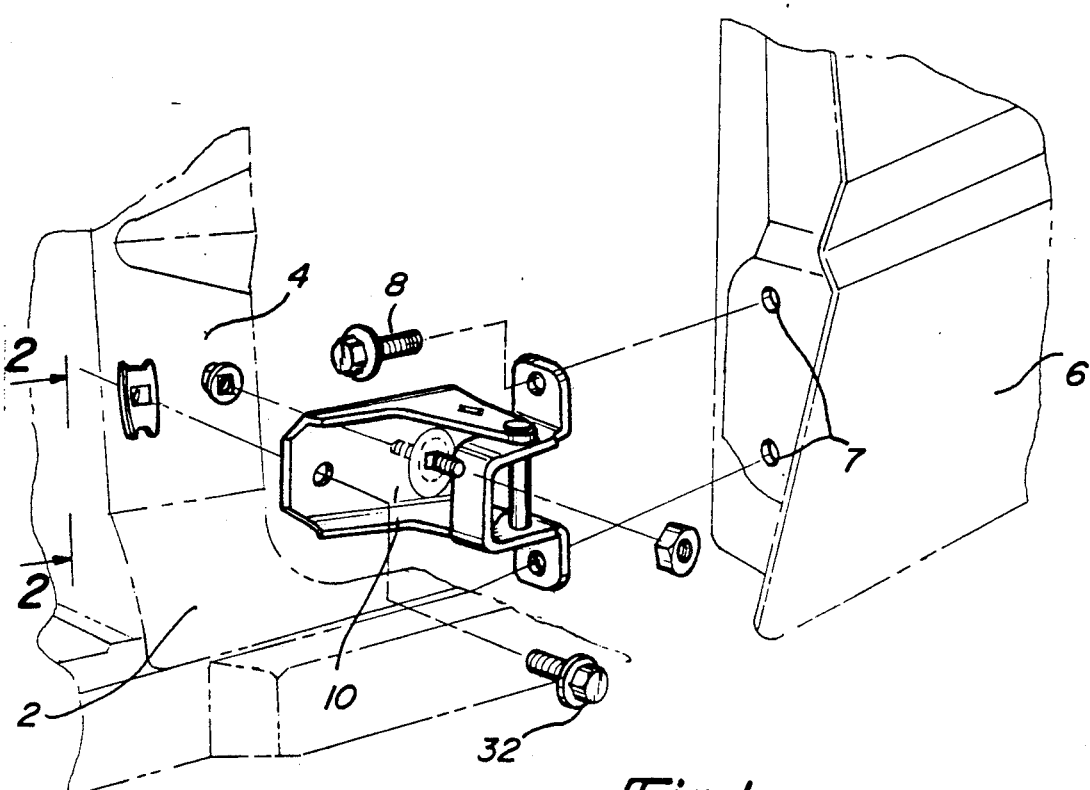
FIG. 1 is a perspective view from the exterior of the vehicle illustrating how the door and hinge assembly are joined to the vehicle body.

Looking to FIG. 1, a vehicle door 6 is attached through two vertically spaced door hinge assemblies 10 (one shown) to a vehicle body 2 along a door pillar 4. Since both hinge assemblies 10 may be treated as if identical, unless otherwise indicated, only one assembly will be described herein. Hinge assembly 10, as can be seen in FIG. 3, consists essentially of a body mounting plate 12 and a door mounting plate 14 which are pivotally connected by a hinge pin 16.

Door mounting plate 14 is preferably a U-shaped stamped metallic plate with flat mounting feet 18 for abuttingly engaging the door 6. Apertures 7 in the door 6 register with apertures 20 in feet 18 to receive bolts 8 to join door 6 to door mounting plate 14. Preferably, all bolts and nuts used in this preferred embodiment will have washers integrally connected to prevent loss of the washers and reduce the total number of individual parts needed.

Body mounting plate 12, also preferably a stamped metallic plate, contains legs 22 which extend perpendicularly from a flat base portion 24, which abuttingly engages the door pillar 4. As may best be seen in FIG.

5, the flat base portion 24 of body mounting plate 12 is pierced by a round aperture 26 and a square aperture 28 located in an outwardly protuding generally circular recess 30, which is best seen in FIG. 4. A bolt 32 and a dual-ended threaded stud 34 are respectively received in the apertures 24, 28 to fasten the body mounting plate 12 to the door pillar 4 of body 2.

The dual-ended threaded stud 34 has formed along its mid-length an integral square change nut 36 to lug 36 throughout and an adjacent integral washer 28. The integral square nut 36 and the integral washer 38 are sized such that integral washer 38 rests within recess 30 and the square nut 36 is recessed within square aperture 28, thus preventing rotation of stud 34 relative to the body mounting plate 20.

Flat portion 24 of body mounting plate 12 abuttingly adjoins to pillar 4 of vehicle body 2. The door pillar 4 contains square apertures 3 and 5 fir receiving the bolt 32 and stud 34, as can be seen in FIG. 4. A sliding retainer 40 is positioned on an interior surface 42 and includes an internally threaded protusion 44 which receives bolt 32.

METHOD OF DOOR ASSEMBLY

As received at the assembly line, dual ended stud 34 is fastened to the body mounting plate 12 of hinge assembly 10. To accomplish this preliminary assembly, dual ended stud 34 is inserted into square aperture 28 such that integral square nut 36 resides within square aperture 28 and integral washer 38 rests within recess 30. This placement prevents rotational translation of dual ended stud 34 relative to body mounting plate 12. A nut 46 having an antegral washer is then threadedly fastened on to stud 34 clampingly constraining the stud 34 to the body mounting plate 12. This assembly sequence may be accomplished prior to the joining of the door mounting plate 14 to the body plate 12 through the pivotal connector of the hinge pin 18.

Door 6 is then fastened to the door mounting plate 16 of the door hinge assembly 10 via bolts 8. This combined door and hinge assembly is then mounted to body 2 along door pillar 4.

Figure 2:
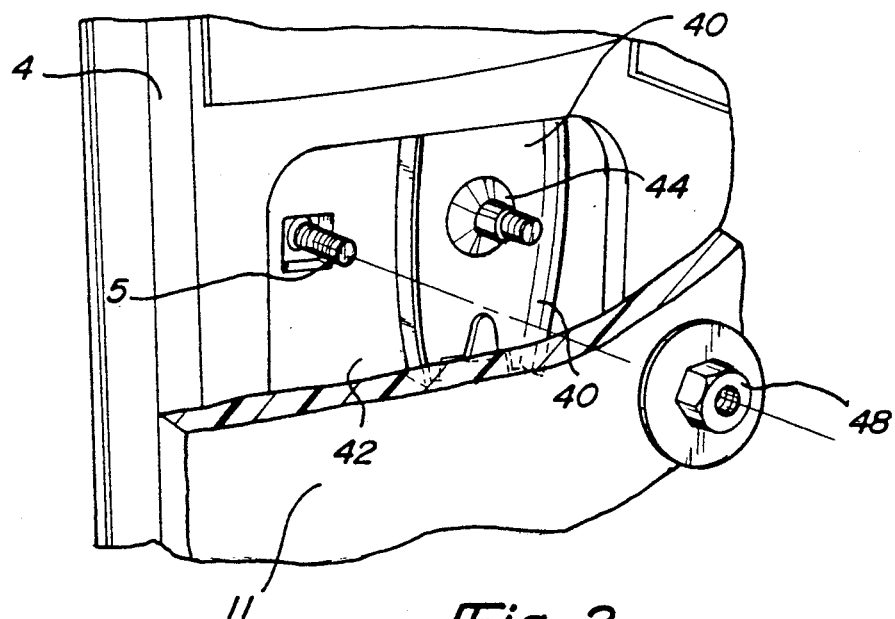
FIG. 2 is a perspective view from the interior of the vehicle in the direction of the arrows 2—2 of FIG. 1.
Figure 5:
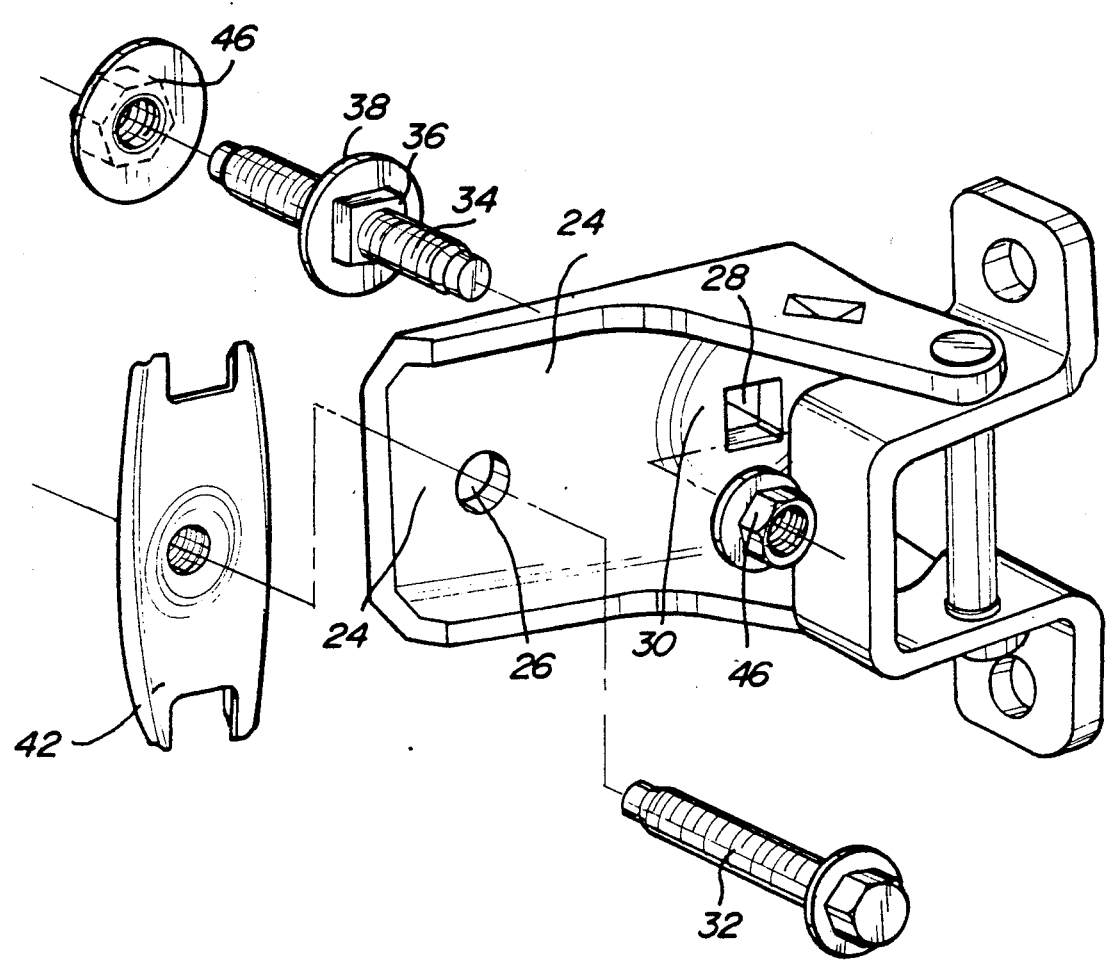
FIG. 5 is an exploded view of the hinge assembly.

The door 6 and hinge assembly 10 are placed against the door pillar 4 such that the flat portion 24 of body mounting plate 20 rests abuttingly against the door pillar 4 and the interiorly protruding end of stud 34 is inserted through aperture 5 of the door pillar 4. The bolt 32 is then placed through aperture 26 of the body mounting plate 12 and aperture 3 of the door pillar 4 and is threadedly received into protrusion 44 of sliding retainer 40. Finally, as seen in FIG. 2, a nut 48 is fastened onto the stud 34 from an interior surface of the vehicle as seen in FIG. 4, preferably by automated means. The automated means preferably will have direct axial access to nut 48 whereas direct axial access to nut 46 is impeded by hinge pin 16, which overlies the stud 34 as may best be seen in FIG. 4. It is to be understood that if a particular vehicle's construction inhibits axial access to a bolt, the hinge could be modified to utilize a fastener like the stud 34 thus permitting the assembly to be released from either the interior or exterior of the vehicle.

Subsequently, when the door 6 and hinge assembly 10 are to be released, both bolt 32 and nut 46 may be threadedly unfastened from the exterior surface of the vehicle. After the door 6 and hinge assemblies 10 are removed from the vehicle body 2, stud 34 will be left protruding from the exterior side of the vehicle since the stud 34 is axially constrained on the pillar 4 throuh abutment of the integral washer 38 and the nut 48 about the aperture 5.

In FIG. 2 only a cutaway portion of a trim component 11 located on the interior of door pillar 4 is shown, providing a view of interiorly protuding stud 34, nut 48 and protrusion 44 of sliding retainer 40. After door 6 has been removed during the assembly process, a suitable trim component 11 is applied to the interior of the door pillar 4 prohibiting access to nut 48. Door 6 may then be trimmed away from the assembly line where more convenenient fixturing may be used.

When door 6 and hinge assembly 10 are to be reattached to the vehicle body 2, body mounting plate 12 is placed abuttingly against the door pillar 4 with exteriorly protruding stud 34 passing through square aperture 28. Nut 46 is threadedly fastened upon stud 34. Bolt 32 is then placed through apertures 26 and 3 and threadedly received into protrusion 44 of sliding retainer 40, which is restrained against rotation with respect to the body 2 in a known manner. This procedure is repeated with the other hinge assembly to complete reattachment of the door 6. This disassembly and assembly procedure is duplicated in the event door 6 or hinge assembly 10 is to be replaced during consumer usage.

What is claimed is:

1. A mounting arrangement for assembling a vehicle door to a vehicle body comprising:
    a door mounting plate adapted to be secured to the vehicle door;
    a body mounting plate adapted to be secured to the vehicle body;
    means for mounting the body and door mounting plates for pivotal movement with respect to each other; and
    at least one means for releasably securing the body mounting plate to the vehicle body wherein the release may be effected from either the interior or exterior surface of the vehicle body, said means for releasably securing comprising at least one non-circular aperture formed through the body mounting plate and at least one stud with fastening means on both ends thereof, and including a cross-section sufficiently complementary with said aperture to prevent rotational movement of said stud with respect to said body mounting plate and wherein one end of the stud is received through the aperture to facilitate tightening of said fastening means and to secure the body mounting plate to the vehicle body.

2. A mounting arrangement as defined in claim 1 wherein said stud includes an integral washer along its length sized to prevent the stud from completely passing through said aperture in the body mounting plate.

3. A mounting arrangement as defined in claim 2 wherein said body mounting plate comprises a recess accommodating the integral washer of the stud such that the washer rests between the plate and vehicle body to allow the vehicle body to remain planar while maintaining flush contact with the plate.

* * * * *